United States Patent
Sun et al.

(10) Patent No.: US 12,126,196 B2
(45) Date of Patent: *Oct. 22, 2024

(54) PRE-CHARGING METHOD OF POWER CONVERSION DEVICE AND POWER CONVERSION DEVICE

(71) Applicant: CONTEMPORARY AMPEREX TECHNOLOGY (HONG KONG) LIMITED, Hong Kong (CN)

(72) Inventors: Weiping Sun, Ningde (CN); Zhimin Dan, Ningde (CN); Zhanliang Li, Ningde (CN); Shuyun Xiong, Ningde (CN); Xiyang Zuo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 306 days.

This patent is subject to a terminal disclaimer.

(21) Appl. No.: 17/543,061

(22) Filed: Dec. 6, 2021

(65) Prior Publication Data
US 2022/0239120 A1    Jul. 28, 2022

Related U.S. Application Data

(63) Continuation of application No. PCT/CN2021/074187, filed on Jan. 28, 2021.

(51) Int. Cl.
*H02J 7/00* (2006.01)

(52) U.S. Cl.
CPC ........ *H02J 7/00036* (2020.01); *H02J 7/0047* (2013.01); *H02J 7/00712* (2020.01); *H02J 2207/20* (2020.01)

(58) Field of Classification Search
CPC ................................................ H02J 7/00032
See application file for complete search history.

(56) References Cited

U.S. PATENT DOCUMENTS 11,077,760 B2    8/2021   Fong et al.
2012/0029728 A1*  2/2012  Hirayama ............... B60L 53/66
                                                    701/1
(Continued)

FOREIGN PATENT DOCUMENTS

CN    103825458 A    5/2014
CN    106385070 A    2/2017
(Continued)

OTHER PUBLICATIONS

CN-110370962 translation, Dai (Year: 2019).*
(Continued)

*Primary Examiner* — Drew A Dunn
*Assistant Examiner* — Tynese V McDaniel
(74) *Attorney, Agent, or Firm* — Scully, Scott, Murphy & Presser, P.C.

(57) ABSTRACT

Embodiments of the present application provide a pre-charging method of a power conversion device and a power conversion device. The power conversion device is used for a power conversion between a charging pile and a power battery and the method includes: receiving, by the power conversion device, a first message transmitted by a battery management system of the power battery, where the first message is used to indicate a charging readiness of the battery management system; and forwarding, by the power conversion device, the first message to the charging pile and performing a pre-charging, where the pre-charging includes charging a capacitor in the power conversion device. The technical solution in embodiments of the present application is capable of ensuring normal performing of a charging process.

14 Claims, 7 Drawing Sheets

(56) References Cited

U.S. PATENT DOCUMENTS

| | | | |
|---|---|---|---|
| 2013/0214737 A1* | 8/2013 | Wu | B60L 53/66 |
| | | | 320/109 |
| 2013/0214738 A1* | 8/2013 | Chen | B60L 58/13 |
| | | | 320/109 |
| 2013/0219084 A1* | 8/2013 | Wu | G06F 3/00 |
| | | | 710/11 |
| 2013/0234675 A1 | 9/2013 | King et al. | |
| 2016/0121748 A1* | 5/2016 | Wytock | B60L 53/63 |
| | | | 320/109 |
| 2018/0056803 A1* | 3/2018 | Hell | B60L 3/0069 |
| 2019/0135121 A1 | 5/2019 | Nozawa | |
| 2019/0202300 A1* | 7/2019 | Pastor | H02J 7/04 |
| 2020/0076210 A1* | 3/2020 | Heyne | H02J 7/0013 |
| 2020/0122595 A1* | 4/2020 | Nonnenmacher | G08G 1/205 |
| 2020/0189395 A1* | 6/2020 | Takahashi | B60L 3/04 |
| 2020/0269710 A1 | 8/2020 | Fong et al. | |
| 2022/0239120 A1* | 7/2022 | Sun | H02J 7/00032 |
| 2022/0239121 A1* | 7/2022 | Li | H02J 7/007194 |
| 2022/0239127 A1* | 7/2022 | Sun | B60L 53/63 |
| 2022/0274502 A1* | 9/2022 | Ahunai | B60L 53/67 |
| 2022/0413833 A1* | 12/2022 | Kodama | G06F 8/65 |
| 2023/0018075 A1* | 1/2023 | Motohira | H02J 7/00032 |
| 2023/0129767 A1* | 4/2023 | Nishibata | H02P 29/024 |
| 2023/0166633 A1* | 6/2023 | Lee | H02M 3/1582 |
| | | | 320/128 |

FOREIGN PATENT DOCUMENTS

| | | | |
|---|---|---|---|
| CN | 106685034 A | | 5/2017 |
| CN | 207743713 U | | 8/2018 |
| CN | 109672588 A | * | 4/2019 |
| CN | 110370962 A | * | 10/2019 |
| CN | 110816359 A | | 2/2020 |
| CN | 111605428 A | | 9/2020 |
| JP | 2011114969 A | | 6/2011 |
| WO | 2017033411 A1 | | 3/2017 |
| WO | 2018220831 A1 | | 12/2018 |

OTHER PUBLICATIONS

CN-109672588 translation, Chen (Year: 2019).*
First office Action dated Jun. 15, 2023 received in Chinese Patent Application No. CN 202180006448.2.
Extended European Search Report dated Jun. 23, 2022 received in European Patent Application No. EP 21809895.2.
Notification to Grant Patent Right for Invention dated Oct. 28, 2023 received in Chinese Patent Application No. CN 202180006448.2.

* cited by examiner

500

Receiving, by a power conversion device, a first message transmitted by a battery management system of a power battery, wherein the first message is used to indicate a charging readiness of the battery management system — 510

Performing, by the power conversion device, a pre-charging, wherein the pre-charging comprises charging a capacitor in the power conversion device — 520

Forwarding, by the power conversion device, the first message to the charging pile after the pre-charging is completed — 530

FIG. 5

PRE-CHARGING METHOD OF POWER CONVERSION DEVICE AND POWER CONVERSION DEVICE

CROSS-REFERENCE TO RELATED APPLICATIONS

This application is a continuation of International Application No. PCT/CN2021/074187, filed on Jan. 28, 2021, the disclosure of which is hereby incorporated by reference in its entirety.

TECHNICAL FIELD

The present application relates to the technical field of batteries and in particular, relates to a pre-charging method of a power conversion device and a power conversion device.

BACKGROUND

An electric vehicle has become an important component for sustainable development of the automobile industry due to energy saving and environmental protection advantages thereof. For the electric vehicle, a battery technique is again another vital factor for its development. Of the battery techniques, how to ensure normal performing of a charging process is a technical problem to be solved.

SUMMARY

The present application provides a pre-charging method of a power conversion device and a power conversion device, which are capable of ensuring normal performing of a charging process.

A first aspect provides a pre-charging method of a power conversion device, wherein the power conversion device is used for a power conversion between a charging apparatus and a power battery and the method includes: receiving, by the power conversion device, a first message transmitted by a battery management system of the power battery, wherein the first message indicates a charging readiness of the battery management system; and transmitting, by the power conversion device, the first message to the charging apparatus and performing a pre-charging, wherein the pre-charging includes charging a capacitor in the power conversion device.

In embodiments of the present application, the power conversion device charges a capacitor in the power conversion device after receiving a charging readiness message of the BMS. In this way, in a subsequent charging process of a power battery, the capacitor will not cause a high pulse current, thus ensuring normal performing and charging security in the charging process.

In a possible implementation, the method further includes: receiving, by the power conversion device, a second message transmitted by the charging apparatus, wherein the second message indicates a charging readiness of the charging apparatus; and transmitting, by the power conversion device, an output suspending message, to the charging apparatus under a condition that the pre-charging is not completed, wherein the output suspending message instructs the charging apparatus to suspend output of a charging power.

In embodiments of the present application, when the pre-charging of the power conversion device is still not completed, the power conversion device causes the charging apparatus to suspend output by transmitting an output suspending message to the charging apparatus, so as to prevent the charging apparatus from outputting a high voltage and causing the capacitor in the power conversion device to generate a high pulse current, thus ensuring normal performing and charging security of the charging process.

In a possible implementation, the method further includes: transmitting, by the power conversion device, an output permitting message, to the charging apparatus under a condition that the pre-charging is completed, wherein the output permitting message instructs the charging apparatus to output a charging power.

In a possible implementation, the method further includes: receiving, by the power conversion device, a second message transmitted by the charging apparatus, wherein the second message indicates a charging readiness of the charging apparatus; and transmitting, by the power conversion device, a charging demand message to the charging apparatus under a condition that the pre-charging is not completed, wherein the charging demand message carries a demand current value and the demand current value is a minimum value of a demand current.

In embodiments of the present application, when the pre-charging of the power conversion device is still not completed, the power conversion device causes the charging apparatus to output a current according to a minimum value of the demand current by transmitting the minimum value of the demand current to the charging apparatus, so as to prevent the charging apparatus from outputting a high current and causing the capacitor in the power conversion device to generate a high pulse current, thus ensuring normal performing and charging security of the charging process.

In a possible implementation, the method further includes: transmitting, by the power conversion device, a charging demand message to the charging apparatus under a condition that the pre-charging is completed, wherein the charging demand message carries a demand current value and the demand current value is an actual value of a present demand current.

In a possible implementation, performing the pre-charging by the power conversion device includes: performing the pre-charging when the power conversion device is determined to be in a normal state by the power conversion device.

In a possible implementation, the method further includes: detecting a state of the power conversion device when the power conversion device is in a process of the pre-charging, and performing an abnormal processing by the power conversion device under a condition that the state of the power conversion device is a pre-charging abnormal state.

In a possible implementation, the method further includes: ending the pre-charging by the power conversion device after determining that the pre-charging is completed.

A second aspect provides a power conversion device, wherein the power conversion device is used for a power conversion between a charging apparatus and a power battery and the power conversion device includes: a receiving module configured to receive a first message transmitted by a battery management system of the power battery, wherein the first message indicates a charging readiness of the battery management system; a transmitting module configured to transmit the first message to the charging apparatus; and a processing module configured to perform a pre-charging, wherein the pre-charging includes charging a capacitor in the power conversion device.

In a possible implementation, the receiving module is further configured to receive a second message transmitted by the charging apparatus, wherein the second message indicates a charging readiness of the charging apparatus; and the transmitting module is further configured to transmit an output suspending message to the charging apparatus under a condition that the pre-charging is not completed, wherein the output suspending message instructs the charging apparatus to suspend output of a charging power.

In a possible implementation, the transmitting module is further configured to transmit an output permitting message to the charging apparatus under a condition that the pre-charging is completed, wherein the output permitting message instructs the charging apparatus to output a charging power.

In a possible implementation, the receiving module is further configured to receive a second message transmitted by the charging apparatus, wherein the second message indicates a charging readiness of the charging apparatus; and the transmitting module is further configured to transmit a charging demand message to the charging apparatus under a condition that the pre-charging is not completed, wherein the charging demand message carries a demand current value and the demand current value is a minimum value of a demand current.

In a possible implementation, the transmitting module is further configured to transmit a charging demand message to the charging apparatus under a condition that the pre-charging is completed, wherein the charging demand message carries a demand current value and the demand current value is an actual value of a present demand current.

In a possible implementation, the processing module is configured to perform the pre-charging when it is determined that the power conversion device is in a normal state.

In a possible implementation, the processing module is configured to detect a state of the power conversion device in a process of the pre-charging, and perform an abnormal processing under a condition that the state of the power conversion device is a pre-charging abnormal state.

In a possible implementation, the processing module is configured to end the pre-charging after it is determined that the pre-charging is completed.

A third aspect provides a power conversion device, including a memory and a processor, wherein the memory is configured to store an instruction and the processor is configured to read the instruction and perform the method in the first aspect and any possible implementation of the first aspect.

A fourth aspect provides a readable storage medium used for storing a computer program, where the computer program is used to perform the method in the first aspect and any possible implementation of the first aspect.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

FIG. 5 is a schematic flowchart diagram of a pre-charging method of a power conversion device disclosed in another embodiment of the present application;

DESCRIPTION OF EMBODIMENTS

Figures 1, 2:
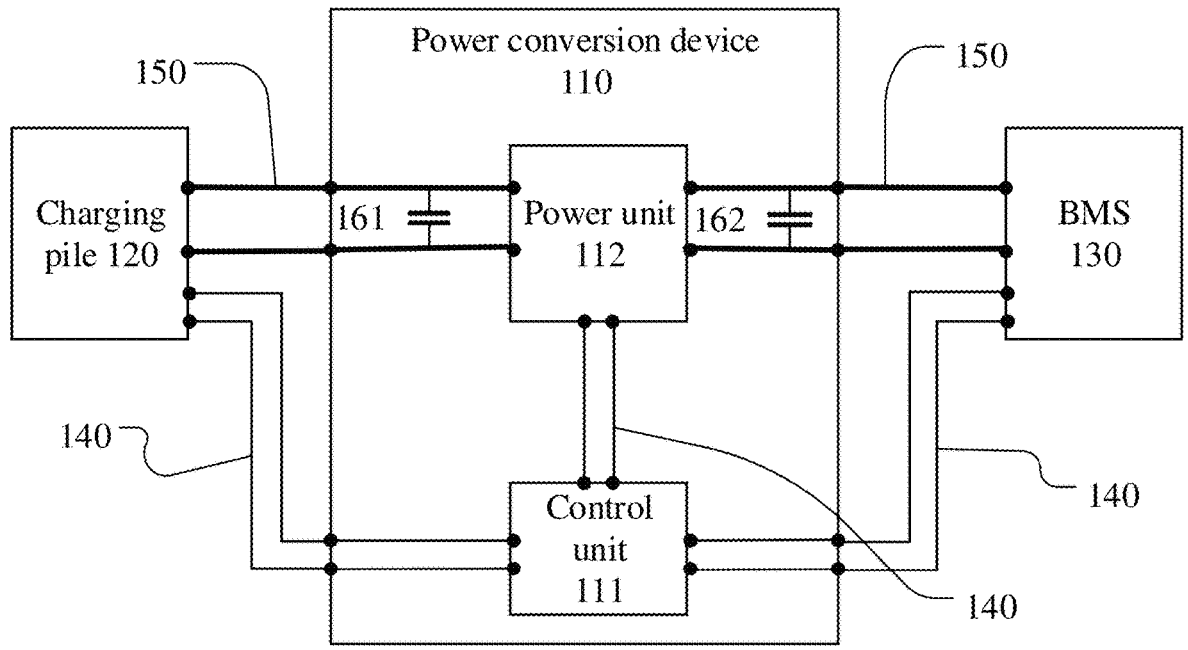
FIG. 1 is a schematic diagram of an application architecture of a power conversion device disclosed in one embodiment of the present application.
FIG. 2 is a schematic flowchart diagram of a pre-charging method of a power conversion device disclosed in one embodiment of the present application.

The following further describes the implementations of the present application in detail with reference to the accompanying drawings and embodiments. Detailed description of the following embodiments and accompanying drawings are used to illustratively state the principles of the present application, but not to limit the scope of the present application, that is, the present application is not limited to the embodiments described.

In descriptions of the present application, it should be noted that unless otherwise described, all the technical and scientific terms used in the present application are the same as the meanings generally understood by a person skilled in the art in the present application. The terms of the present application used in the description of the present application are merely intended for the purpose of describing specific embodiments, but not merely to limit the present application. Terms "comprising" and "having" in the description, claims and descriptions of the accompanying drawings in the present application, as well as their any deformations intend to cover non-exclusive inclusions. The terms "first", "second", and so on in the description and claims or accompanying drawings of the present application are intended to distinguish different objects, but not to describe particular sequences or primary-secondary relationship.

"Embodiments" mentioned in the present application mean that specific features, structures or features described in embodiments combined can be comprised in at least one embodiment of the present application. The phrase appearing at each position of the description does not necessarily indicate the same embodiment and it is not an exclusively independent or alternative embodiment of other embodiments. A person skilled in the art understands implicitly and explicitly that embodiments described in the present application can be combined with other embodiments.

In the description of the present application, it should be further noted that unless otherwise prescribed and defined clearly, terms "mounting", "communicating", "connection"

and "attaching" should be understood in a broad sense, which for example can be a fixed connection and can also be a detachable connection or an integral connection; or can be a direct connection and can also be a connection through an intermediary and can be communication inside two elements. A person of ordinary skill in the art can understand specific meanings of these terms in the present application based on specific situations.

A power battery is a battery that provides a power source for an electric apparatus. Optionally, the power battery can be a power storage battery. Regarding types of the battery, the battery power can be a lithium-ion battery, a lithium-metal battery, a lead-acid battery, a nickel-cadmium battery, a nickel-hydrogen battery, a lithium-sulfur battery, a lithium-air battery or a sodium-ion battery etc., which are not limited in embodiments of the present application. Regarding scale of the battery, the power battery in embodiments of the present application can be a core/a battery cell and can also be a battery module or a battery pack, which are not specifically limited in embodiments of the present application. Optionally, the electric apparatus can be a vehicle, a ship or a spacecraft, which are not limited by embodiments of the present application. A battery management system (BMS) of a power battery is a control system for protecting using security of a power battery by implementing such functions as charging and discharging management, high-voltage control, battery protection, collection of battery data and evaluation of a battery state etc.

A charging pile, also known as a charger, is an apparatus that charges a power battery. The charging pile can output a charging power according to charging requirements of the BMS to charge the power battery, for example, the charging pile can output voltage and current according to the demand voltage and the demand current transmitted by the BMS.

However, in some special scenes, the range of the voltage and the current that can be output by the charging pile fails to match the power battery. For example, in a low-temperature scene, the minimum voltage or current that can be output by the charging pile is also likely to cause lithium plating in a charging process, resulting in failure of charging the power battery normally. In addition, in some cases, conversion of a power form is also likely needed between the charging pile and the power battery, such as a voltage change, a current change, a change of a power state, and a change in a current, a voltage and a power time sequence etc.

For the above case, embodiments of the present application provide a power conversion device and the power conversion can perform a power conversion between the charging pile and the power battery. When the requirement of performing a power conversion between the charging pile and the power battery exists, the power conversion device converts a power type output by the charging pile into a power type required by the power battery. For example, the power conversion device can convert a DC power output by the charging pile into a pulse power, or a changing voltage value, a changing current value or a time sequence of a changing voltage and current.

A large-capacitance capacitor exists in a high-voltage loop of the power conversion device. At the moment of starting the power conversion device, a high voltage in a charging high-voltage loop will charge the large-capacitance capacitor in the power conversion device, thereby generating a high pulse current. The high pulse current is likely to damage the power conversion device or components in the power conversion device, such as a high-voltage contactor.

In view of this, the present application provides a pre-charging method of a power conversion device and by pre-charging a capacitor in the power conversion device, the high pulse current caused by the capacitor in the power conversion can be prevented from damaging components on a charging loop, thereby ensuring normal performing and charging security of a charging process.

It should be understood that "pre-charging" can also be known as a "re-charging, which is not limited by embodiments of the present application.

FIG. 1 shows a schematic diagram of an application architecture of a power conversion device in embodiments of the present application. As shown in FIG. 1, the power conversion device 110 is disposed between the charging pile 120 and the BMS of the power battery, that is, the power conversion device 110 is connected to the charging pile 120 and the BMS 130 respectively and the charging pile 120 is not connected to the BMS 130 directly.

When the power conversion device 110 is not disposed, upon charging the power battery, the charging pile 120 is directly connected to the BMS 130 and then starts the charging process to charge the power battery. As described above, in some cases, the charging pile 120 perhaps cannot directly charge the power battery normally. Therefore, in embodiments of the present application, the power conversion device 110 is added for a power conversion between the charging pile 120 and the power battery.

Optionally, the power conversion device 110 can include a control unit 111 and a power unit 112. The control unit 111 is responsible for detecting a state of the charging pile 120 and the BMS 130 in a charging process; and the control unit 111 is connected respectively to the charging pile 120 and the BMS 130 through the communication line 140 to perform information interaction respectively with the charging pile 120 and the BMS 130. In addition, the control unit 111 is further connected to the power unit 112 through the communication line 140 to perform information interaction with the power unit 112 and control the power unit 112 to perform a power conversion. For example, the communication line 140 can be a controller area network (CAN) communication line.

The power unit 112 is responsible for converting a power type output by the charging pile 120 into a power type required by the power battery according to the instruction of the control unit 111. The power unit 112 and the control unit 111 are connected through the communication line 140 for information interaction. A communication protocol can be configured between the control unit 111 and the power unit 112, such as defining grammar, semantics and time sequence etc. of the communication to ensure normal interaction between the control unit 111 and the power unit 112.

A control policy can be configured on the control unit 111. For example, the control unit 111 determines the state of the present charging process by parsing a charging message of the charging pile 120 and the BMS 130 to control the power unit 112 to perform a corresponding operation. For example, when a pre-charging condition is satisfied, the power unit 112 is controlled to perform a pre-charging operation. Meanwhile, the control unit 111 communicates with the power unit 112 to obtain a state of the power unit 112 to perform a corresponding operation. For example, when the power unit 112 reports a fault, the control unit 111 timely transmits a command of stopping pre-charging.

The power unit 112 is connected respectively to the charging pile 120 and the BMS 130 through a high-voltage line 150 to output a charging power output by the charging pile 120 through the high-voltage line 150 to the BMS after the charging power is converted to charge the power battery.

A large-capacitance capacitor exists in the power conversion device 110, such as a first capacitor 161 and a second capacitor 162. As described above, the capacitor in the power conversion device 110 is likely to cause a high pulse current, thus damaging components on the charging loop. Embodiments of the present application provide a pre-charging solution for the power conversion device 110 to solve the above problem.

FIG. 2 shows a schematic flowchart diagram of a pre-charging method 200 of a power conversion device in one embodiment of the present application. The power conversion device is used for a power conversion between the charging pile and the power battery. For example, the power conversion device can be the power conversion device 110 in FIG. 1.

210, a power conversion device receives a first message transmitted by a battery management system of a power battery, wherein the first message indicates a charging readiness of the battery management system.

After starting the charging process, the charging pile and the BMS firstly perform a charging readiness, during which period the power conversion device forwards the message between the charging pile and the BMS, without changing contents of the message. After the BMS readiness is made, the BMS transmits a first message indicating a charging readiness of the BMS. Since the power conversion device is disposed between the charging pile and the BMS, the first message firstly reaches the power conversion device.

220: the power conversion device forwards the first message to the charging pile and performs a pre-charging, wherein the pre-charging includes charging a capacitor in the power conversion device.

After receiving the first message, the power conversion device forwards the first message to the charging pile without changing contents of the message. Meanwhile, the power conversion device performs a pre-charging. At this time, the BMS has been ready. Therefore, the power conversion device can use the voltage of the power battery to charge the capacitor in the power conversion device. Since the power conversion device has simultaneously transmitted the charging readiness message of the BMS to the charging pile, the charging pile can also perform a pre-charging simultaneously, that is, using the voltage of the power battery to charge the capacitor in the charging pile. In this case, the power conversion device and the charging pile simultaneously perform the pre-charging.

In embodiments of the present application, the power conversion device charges a capacitor in the power conversion device after receiving a charging readiness message of the BMS. In this way, in a subsequent charging process of a power battery, the capacitor will not cause a high pulse current, thus ensuring normal performing and charging security in the charging process.

Figure 3:
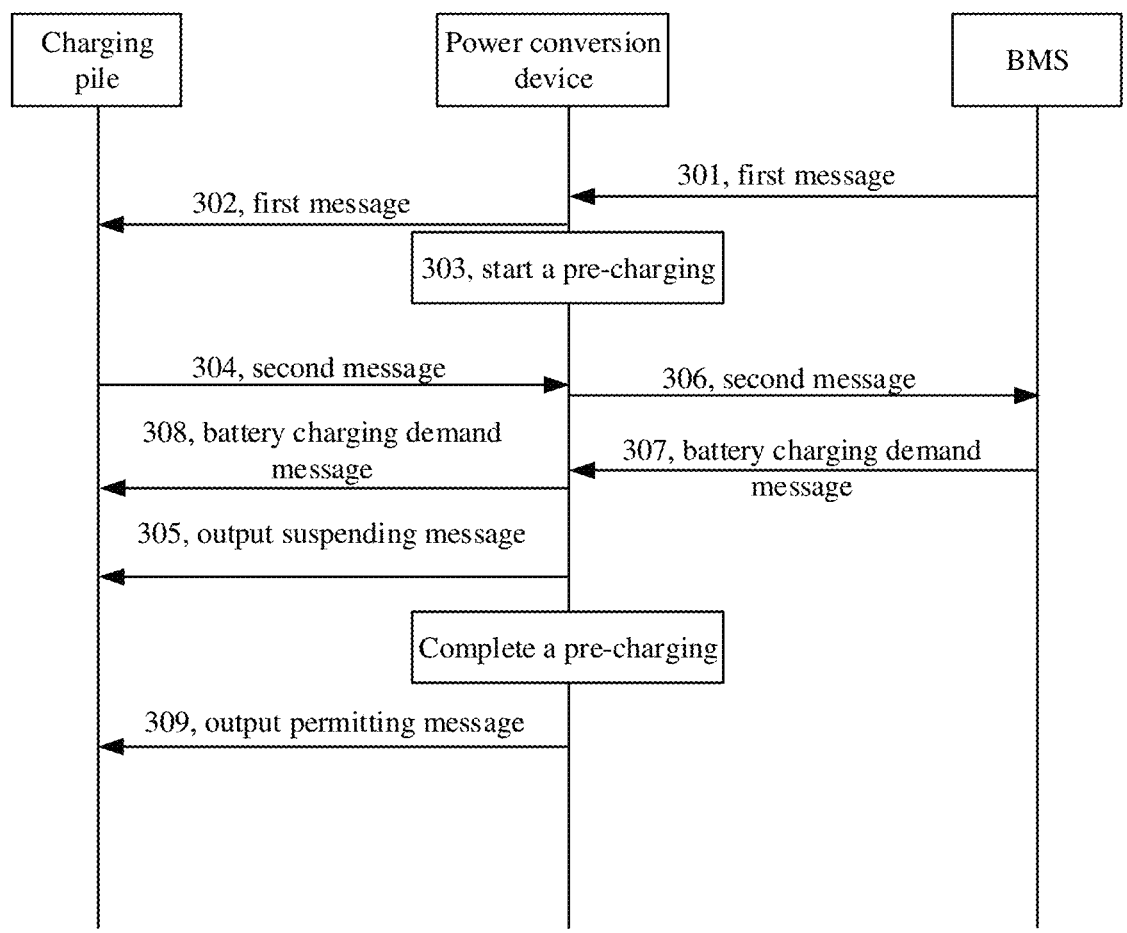
FIG. 3 is an interaction flowchart diagram of a pre-charging method disclosed in one embodiment of the present application.

FIG. 3 shows an interaction flowchart diagram of a pre-charging method in one embodiment of the present application. The power conversion device, the charging pile and the BMS in FIG. 3 can respectively be the power conversion device 110, the charging pile 120 and the BMS 130 in FIG. 1.

301, a BMS transmits a first message.

After the BMS is ready, a first message of a charging readiness is transmitted to the charging pile, enabling the charging pile to confirm that the BMS has been ready for charging. The first message of the BMS is firstly transmitted to the power conversion device.

302, a power conversion forwards the first message to a charging pile.

303, the power conversion starts a pre-charging.

The power conversion starts the pre-charging while forwarding the first message to the charging pile.

304, the charging pile transmits a second message.

After receiving the first message, the charging pile makes a charging preparation, such as pre-charging and judges whether an output voltage is in a normal range etc. After the preparation is made, the charging pile transmits a second message indicating a charging readiness of the charging pile, enabling the BMS to confirm that the charging pile has been ready for output. The second message of the BMS is firstly transmitted to the power conversion device.

Since the pre-charging process of the power conversion is likely to continue for a long term, the pre-charging process of the power conversion device is not completed possibly when the power conversion device receives the second message transmitted by the charging pile. Optionally, in this case, the power conversion device can perform following processing.

305, the power conversion device transmits an output suspending message to the charging pile.

The power conversion device transmits an output suspending message, to the charging pile under a condition that the pre-charging is not completed, wherein the output suspending message instructs the charging pile to suspend output of a charging power.

The charging pile transmits a second message, indicating that the charging pile has been ready for output. When the pre-charging of the power conversion device is still not completed, it is still likely to cause generation of a high pulse current by a capacitor in the power conversion device under a condition that the charging pile outputs a high voltage at this time, thus affecting normal performing of the charging process. Therefore, the power conversion device transmits an output suspending message to the charging pile, enabling the charging pile to suspend output.

Optionally, the power conversion device transmits an output suspending message to the charging pile in the following manner.

306, the power conversion device forwards the second message to the BMS.

307, the BMS transmits a battery charging demand message.

After receiving the second message of the charging pile, the BMS confirms that the charging pile has been ready for output. Therefore, the battery charging demand message is transmitted to the charging pile. The battery charging demand message includes a charging demand of the power battery, such as a demand voltage, a demand current and the like.

308, the power conversion device forwards the battery charging demand message to the charging pile.

In 305, the power conversion device transmits an output suspending message to the charging pile. Optionally, the output suspending message can employ a power battery state information message to set a charging-permission field therein as "disable", thus disabling the charging pile to output the charging power.

Optionally, the power conversion device can perform following processing after the pre-charging is completed.

309, the power conversion device transmits an output permitting message to the charging pile.

The power conversion device transmits an output permitting message, to the charging pile under a condition that the pre-charging is completed, wherein the output permitting message instructs the charging pile to output a charging power.

Charging can be performed normally after the pre-charging is completed. At this time, the charging pile can be permitted to perform a normal output. Optionally, the output permitting message can employ a power battery state information message to set a charging-permission field therein as "permit", thus permitting the charging pile to output the charging power.

In embodiments of the present application, when the pre-charging of the power conversion device is still not completed, the power conversion device causes the charging pile to suspend output by transmitting an output suspending message to the charging pile, so as to prevent the charging pile from outputting a high voltage and causing the capacitor in the power conversion device to generate a high pulse current, thus ensuring normal performing and charging security of the charging process.

Figure 4:
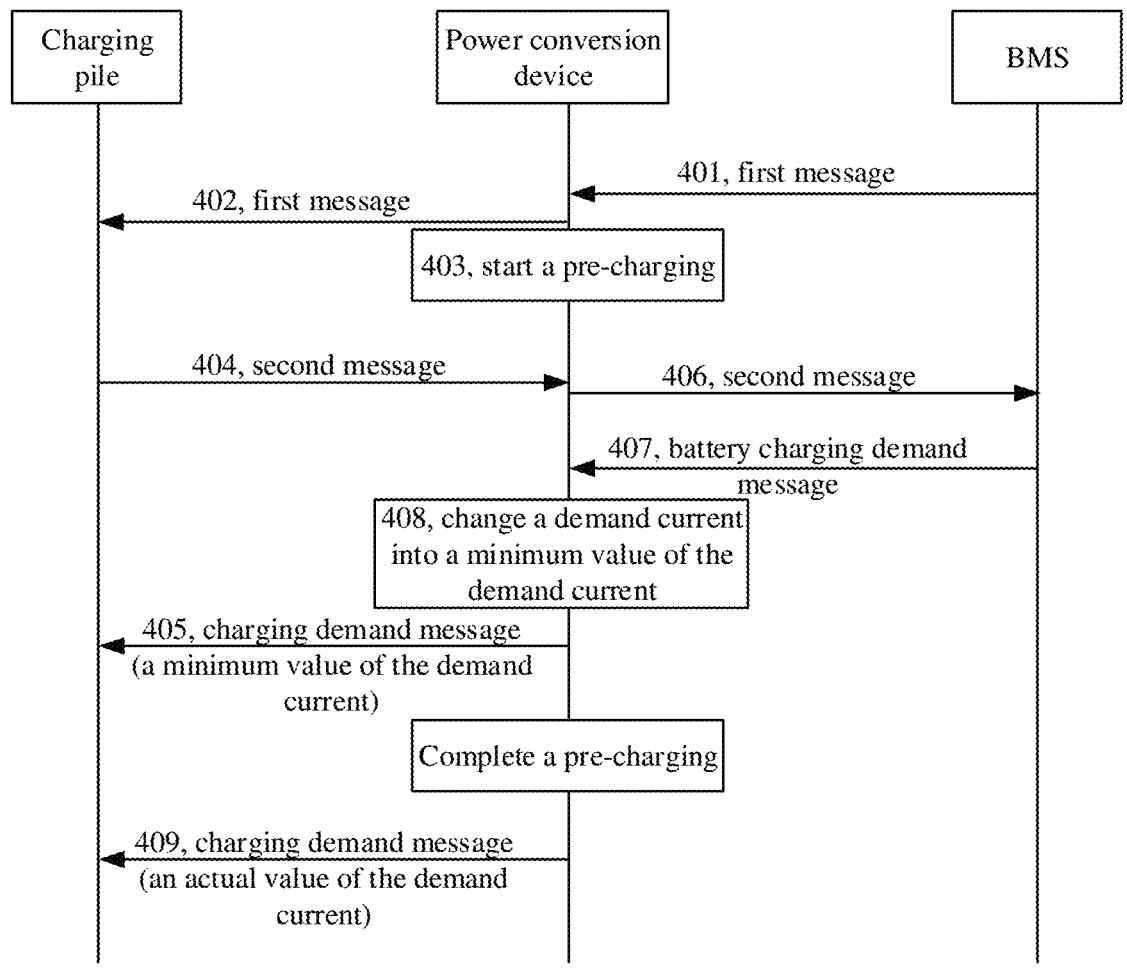
FIG. 4 is an interaction flowchart diagram of a pre-charging method disclosed in another embodiment of the present application.

FIG. 4 shows an interaction flowchart diagram of a pre-charging method in another embodiment of the present application. The power conversion device, the charging pile and the BMS in FIG. 4 can respectively be the power conversion device 110, the charging pile 120 and the BMS 130 in FIG. 1. Steps 401-404 in FIG. 4 are the same as steps 301-304 in FIG. 3. Reference can be made to related descriptions in FIG. 3. For conciseness, they are not repeated herein.

405, the power conversion device transmits a charging demand message to the charging pile.

The power conversion device transmits a charging demand message to the charging pile under a condition that the pre-charging is not completed, wherein the charging demand message carries a demand current value and the demand current value is a minimum value of a demand current.

The charging pile transmits a second message, indicating that the charging pile has been ready for output. When the pre-charging of the power conversion device is still not completed, it is still likely to cause generation of a high pulse current by a capacitor in the power conversion device under a condition that the charging pile outputs a high current at this time, thus affecting normal performing of the charging process. Therefore, the power conversion device can enable the charging pile to output a current according to a minimum value of the demand current by transmitting the minimum value of the demand current to the charging pile. In this case, the current output by the charging pile is very small, thus without causing the capacitor in the power conversion device to generate a high pulse current.

Optionally, the power conversion device can transmit a charging demand message to the charging pile in the following manner.

406, the power conversion device forwards the second message to the BMS.

407, the BMS transmits a battery charging demand message.

After receiving the second message of the charging pile, the BMS confirms that the charging pile has been ready for output. Therefore, the battery charging demand message is transmitted to the charging pile. The battery charging demand message includes a charging demand of the power battery, such as a demand voltage, a demand current and the like.

408, the power conversion device modifies the demand current in the battery charging demand message transmitted by the BMS into the minimum value of the demand current, thereby obtaining a new charging demand message.

For example, the minimum value of the demand current can be zero. However, embodiments of the present application do not limit this herein.

In 405, the power conversion device transmits the charging demand message to the charging pile. The demand current value of the charging demand message is the minimum value of the demand current, thus enabling the charging pile to output a current according to the minimum value of the demand current.

Optionally, the power conversion device can perform following processing after the pre-charging is completed.

409, the power conversion device transmits a charging demand message to the charging pile.

The power conversion device transmits a charging demand message to the charging pile under a condition that the pre-charging is completed, wherein the charging demand message carries a demand current value and the demand current value is an actual value of a present demand current.

Charging can be performed normally after the pre-charging is completed. Therefore, the demand current value in the charging demand message transmitted to the charging pile is an actual value of a present demand current. That is, in this case, the power conversion device can directly forward the battery charging demand message transmitted by the BMS to the charging pile without modifying it.

In embodiments of the present application, when the pre-charging of the power conversion device is still not completed, the power conversion device causes the charging pile to output a current according to a minimum value of the demand current by transmitting the minimum value of the demand current to the charging pile, so as to prevent the charging pile from outputting a high current and causing the capacitor in the power conversion device to generate a high pulse current, thus ensuring normal performing and charging security of the charging process.

In the previous embodiment, the power conversion device and the charging pile simultaneously perform the pre-charging. Optionally, the power conversion device and the charging pile can also perform the pre-charging successively. The following describes the solution.

FIG. 5 shows a schematic flowchart diagram of a pre-charging method 500 of a power conversion device in another embodiment of the present application. The power conversion device is used for a power conversion between the charging pile and the power battery. For example, the power conversion device can be the power conversion device 110 in FIG. 1.

510, a power conversion device receives a first message transmitted by a battery management system of a power battery, wherein the first message indicates a charging readiness of the battery management system.

After starting the charging process, the charging pile and the BMS firstly perform a charging readiness, during which period the power conversion device forwards the message between the charging pile and the BMS, without changing contents of the message. After the BMS readiness is made, the BMS transmits a first message indicating a charging readiness of the BMS. Since the power conversion device is disposed between the charging pile and the BMS, the first message firstly reaches the power conversion device.

520: the power conversion device performs a pre-charging, wherein the pre-charging includes charging a capacitor in the power conversion device.

After receiving the first message, the power conversion device starts a pre-charging. At this time, the BMS has been ready. Therefore, the power conversion device can use the voltage of the power battery to charge the capacitor in the power conversion device.

530, the power conversion device forwards the first message to the charging pile after the pre-charging is completed.

Charging can be performed normally after the pre-charging is completed. At this time, the charging readiness message of the BMS can be transmitted to the charging pile, enabling the charging pile to perform a charging readiness.

After receiving the charging readiness message of the BMS, the charging pile can also perform a pre-charging, that is, using the voltage of the power battery to charge the capacitor in the charging pile. The pre-charging process of the power conversion device is likely to continue for a long term, that is, if the power conversion device and the charging pile start the pre-charging simultaneously, the charging pile completes the charging readiness when the pre-charging of the power device is not completed still. It is still likely to cause generation of a high pulse current by the capacitor in the power conversion device if the charging pile outputs a high voltage at this time, thus affecting normal performing of the charging process.

In the application embodiment, after completing the pre-charging, the power conversion device forwards the charging readiness message of the BMS to the charging pile again. In this way, it can prevent the charging pile from outputting the high voltage when the pre-charging of the power conversion device is still not completed, thus ensuring normal performing and charging security of the charging process.

In the embodiment, the power conversion device firstly performs the pre-charging and after completing the pre-charging of the power conversion device, the charging pile then performs the pre-charging. That is, the power conversion device and the charging pile perform the pre-charging successively.

Figure 6:
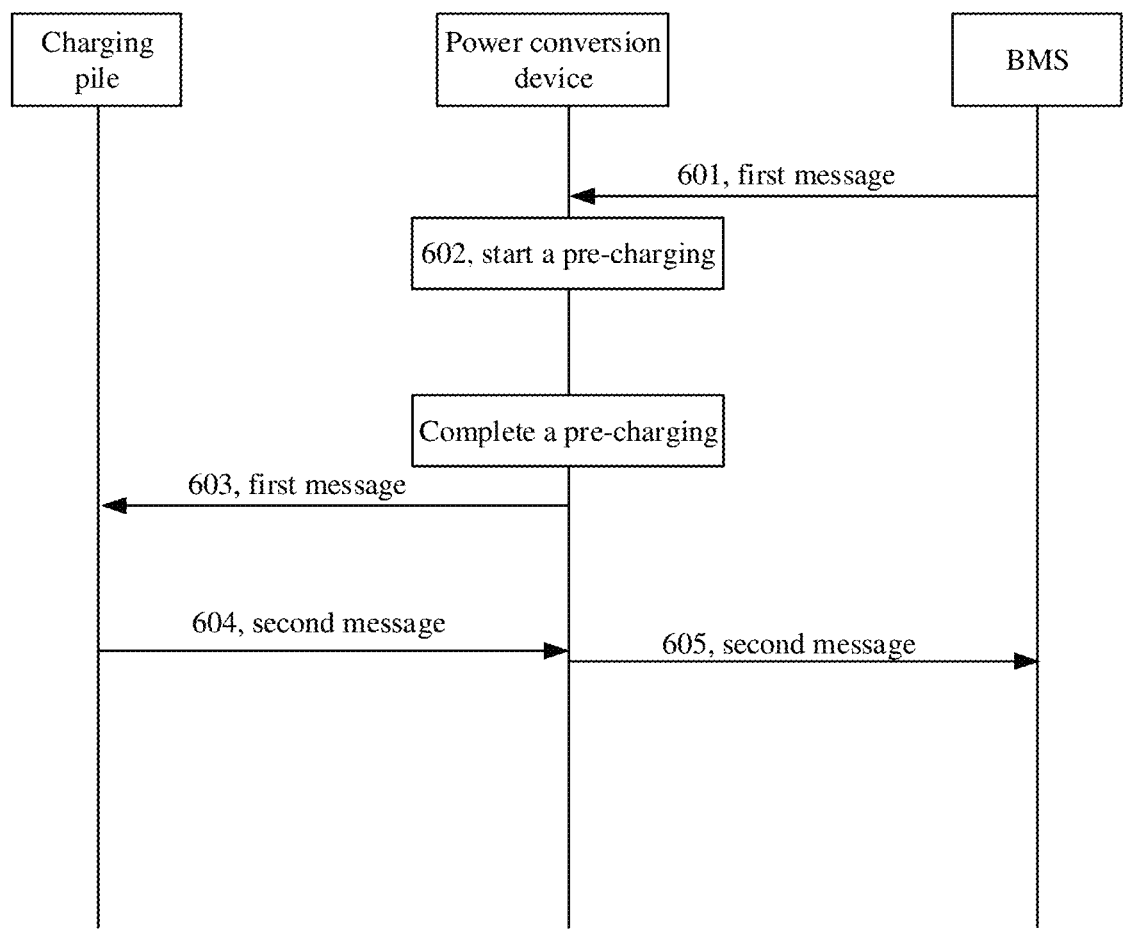
FIG. 6 is an interaction flowchart diagram of a pre-charging method disclosed in another embodiment of the present application.

FIG. 6 shows an interaction flowchart diagram of a pre-charging method in another embodiment of the present application. The power conversion device, the charging pile and the BMS in FIG. 6 can respectively be the power conversion device 110, the charging pile 120 and the BMS 130 in FIG. 1.

601, a BMS transmits a first message.

After the BMS is ready, a first message of a charging readiness is transmitted to the charging pile, enabling the charging pile to confirm that the BMS has been ready for charging. The first message of the BMS is firstly transmitted to the power conversion device.

602, the power conversion starts a pre-charging.

After receiving the first message, the power conversion device starts a pre-charging.

603, the power conversion device forwards the first message to the charging pile after the pre-charging is completed.

604, the charging pile transmits a second message.

After receiving the first message, the charging pile makes a charging preparation, such as pre-charging and judges whether an output voltage is in a normal range etc. After the preparation is made, the charging pile transmits a second message indicating a charging readiness of the charging pile, enabling the BMS to confirm that the charging pile has been ready for output. The second message of the BMS is firstly transmitted to the power conversion device.

605, the power conversion device forwards the second message to the BMS.

Since the power conversion device has completed the pre-charging, charging can be performed normally, and after receiving the second message transmitted by the charging pile, the power conversion device forwards the second message to the BMS. In this way, the BMS and the charging pile can continue to perform a subsequent charging process.

In embodiments of the present application, the power conversion device and the charging pile perform the pre-charging successively. In this way, the charging pile can be made to output a high voltage after the pre-charging of the power conversion device is completed, thus ensuring normal performing and charging security of the charging process.

The previous text previously describes the process for the power conversion device and the charging pile to simultaneously perform the pre-charging, and the process for the power conversion device and the charging pile to perform the pre-charging successively. The following describes specific operations of the power conversion device in the pre-charging process.

In addition to the interaction of the power conversion device with the charging pile and the BMS, the power conversion device can also detect the state of the power conversion device during the pre-charging.

Optionally, in one embodiment of the present application, the power conversion device determines to perform the pre-charging when the power conversion device is in a normal state.

Optionally, in one embodiment of the present application, in the pre-charging process, the power conversion device detects a state of the power conversion device and the power conversion device performs an abnormal processing under a condition that the state of the power conversion device is a pre-charging abnormal state. For example, the pre-charging abnormal state can include a pre-charging fault, a pre-charging timeout, and no entry to pre-charging etc.

Optionally, in one embodiment of the present application, the power conversion device ends the pre-charging after determining that the pre-charging is completed. Under a condition that the pre-charging is performed normally, the power conversion device ends the pre-charging after determining that the pre-charging is completed.

The following describes the pre-charging process of the power conversion device with an example of the power conversion device including a control unit and a power unit. For example, the power conversion device can be the power conversion device 110 in FIG. 1, including a control unit 111 and a power unit 112.

Figure 7:
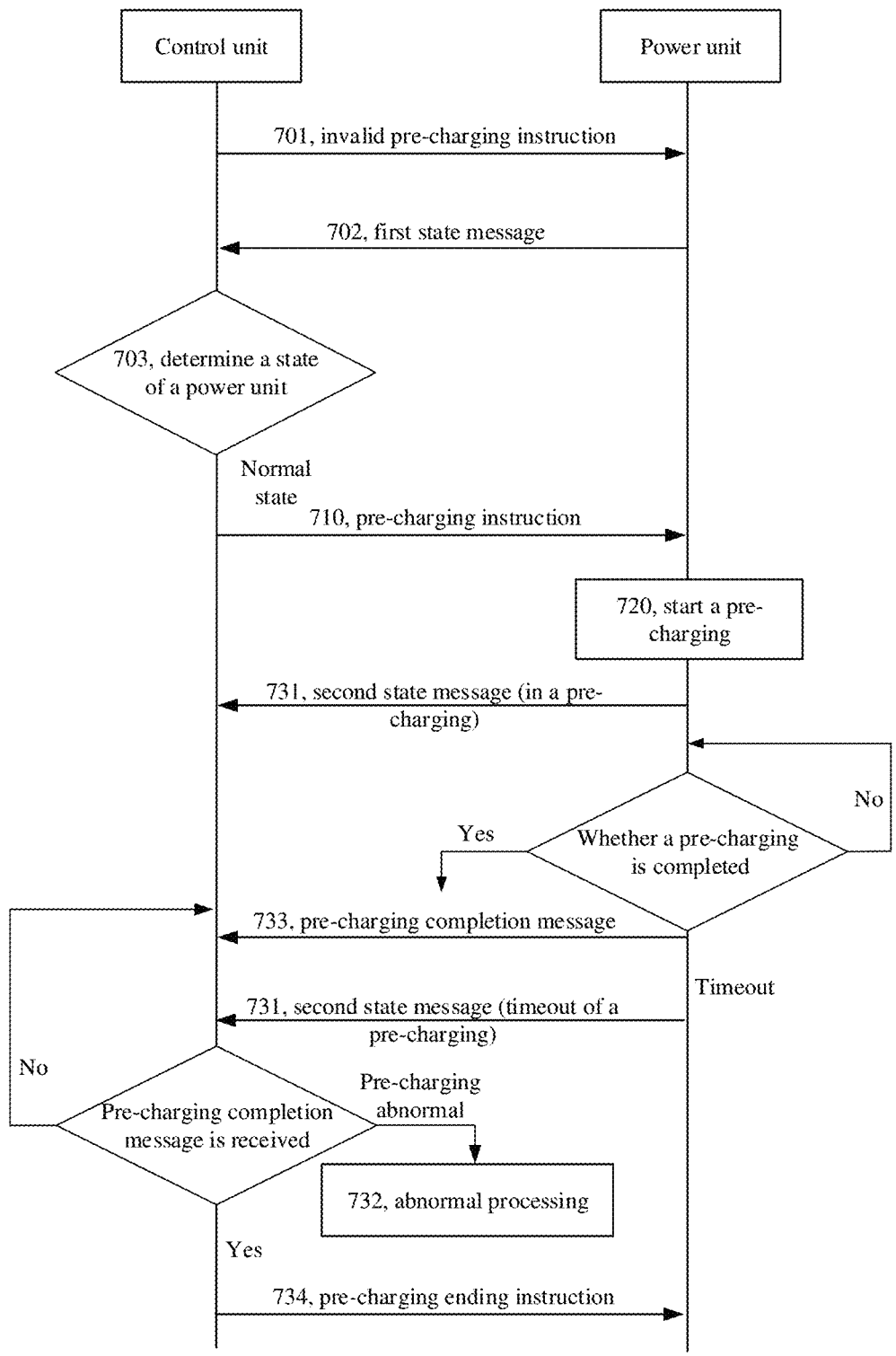
FIG. 7 is a schematic flowchart diagram of a pre-charging method of a power conversion device disclosed in another embodiment of the present application.

FIG. 7 shows a schematic flowchart diagram of a pre-charging method of a power conversion device in one embodiment of the present application. The power conversion unit is used for a power conversion between a charging pile and a power battery, and the power conversion device includes a control unit and a power unit.

710, the control unit transmits a pre-charging instruction to the power unit when the power unit is in a normal state.

720, the power unit starts a pre-charging according to the pre-charging instruction, wherein the pre-charging includes charging a capacitor in the power unit.

Specifically, the pre-charging of the power conversion device is performed by the power unit under control of the control unit. When the control unit conforms that the power unit is in a normal state, a pre-charging instruction is transmitted to the power unit to start a pre-charging. The power unit waits for a pre-charging instruction and starts the pre-charging upon receiving the pre-charging instruction.

Optionally, as shown in FIG. 7, the control unit can determine the state of the power unit through the following manner.

701, before the pre-charging instruction is transmitted to the power unit, the control unit transmits an invalid pre-charging instruction to the power unit.

The invalid pre-charging instruction is used for triggering the power unit to detect a state of the power unit.

702, in response to the invalid pre-charging instruction, the power unit transmits a first state message to the control unit, wherein the state of the power unit is carried in the first state message.

After receiving the invalid pre-charging instruction, the power unit starts working to detect a present state of the power unit and transmits the state of the power unit to the control unit through the first state message.

For example, the state of the power unit in the first state message can be represented as: 0 initializing; 1 normal state; 2 fault state and 3 invalid state. 0 initializing state represents that initializing is being performed, resulting in requirement of waiting; 1 normal state represents that the power unit can be pre-charged; 2 fault state represents appearance of a fault; and 3 invalid state represents that pre-charging cannot be performed.

703, the control unit determines a state of the power unit according to the first state message.

For example, when the state of the power unit in the first state message is 1 normal state, it represents that the pre-charging can be performed and the control unit transmits a pre-charging instruction to the power unit in 710. When the state of the power unit is 0 initializing state, the control unit will wait until the state of the power unit is 1 normal state. When the state of the power unit is 2 fault state, the control unit will enter a corresponding fault processing mode, thereby stopping the pre-charging. When the state of the power unit is 3 invalid state, the pre-charging cannot be performed and the control unit will also enter a corresponding fault processing mode, thereby stopping the pre-charging.

Optionally, as shown in FIG. 7, after the pre-charging is started, the power unit and the control unit can also perform the following operations.

731, the power unit detects a state of the power unit and transmits a second state message to the control unit, wherein the state of the power unit is carried in the second state message.

In a pre-charging process, the power unit continuously detects its own state and transmits the state to the control unit through the second state message. For example, the state of the power unit in the second state message can include 0 no entry to pre-charging; 1 in pre-charging; 2 pre-charging timeout; 3 pre-charging fault, and 4 pre-charging success. 0 no entry to pre-charging represents failure of entering a pre-charging state; 1 in pre-charging represents normal entry to the pre-charging state; 2 pre-charging timeout represents failure of completing pre-charging within the predetermined time of receiving a pre-charging instruction (such as 5s); 3 pre-charging fault represents that a fault appears to pre-charging; and 4 pre-charging success represents completion of pre-charging within a predetermined time of receiving a pre-charging instruction (such as 5s).

732, the control unit performs an abnormal processing when the power unit is in a pre-charging abnormal state.

The pre-charging abnormal state can include no entry to pre-charging, pre-charging timeout and a pre-charging fault etc. In this case, the control unit performs an abnormal processing.

733, after the pre-charging is completed, the power unit transmits a pre-charging completion message to the control unit.

The pre-charging completion message can be the first type in the second state message, that is, the second state message indicates a situation with pre-charging success.

734, the control unit transmits a pre-charging end instruction to the power unit according to the pre-charging completion message. Till now, the pre-charging process ends.

In embodiments of the present application, the control unit controls the power unit to perform the pre-charging according to the state of the power unit, thereby realizing charge of the capacitor in the power conversion unit. In this way, in a subsequent charging process of a power battery, the capacitor will not cause a high pulse current, thus ensuring normal performing and charging security in the charging process.

Optionally, when the power conversion device includes a control unit and a power unit, the control unit is responsible for interaction with the charging pile and the BMS. That is, the control unit can also perform the following operations.

Optionally, in one embodiment of the present application, the control unit receives a first message transmitted by a battery management system of the power battery before the control unit transmits the pre-charging instruction to the power unit, wherein the first message indicates a charging readiness of the battery management system.

Optionally, in one embodiment of the present application, the control unit transmits the first message to the charging pile after completing the pre-charging, the control unit receives a second message transmitted by the charging pile, wherein the second message indicates a charging readiness of the charging pile; and the control unit forwards the second message to the battery management system.

Optionally, in one embodiment of the present application, the control unit forwards the first message to the charging pile; the control unit receives a second message transmitted by the charging pile, wherein the second message indicates a charging readiness of the charging pile; and the control unit transmits an output suspending message to the charging pile under a condition that the pre-charging is not completed, wherein the output suspending message instructs the charging pile to suspend output of a charging power.

Optionally, in one embodiment of the present application, the control unit forwards the first message to the charging pile; the control unit receives a second message transmitted by the charging pile, wherein the second message indicates a charging readiness of the charging pile; and the control unit transmits a charging demand message to the charging pile under a condition that the pre-charging is not completed, wherein the charging demand message carries a demand current value and the demand current value is a minimum value of a demand current.

The previous text describes the pre-charging method of a power conversion device in embodiments of the present application and the following describes the power conversion device in embodiments of the present application. It should be understood that regarding related descriptions in the following embodiments, reference can be made to the previous embodiments. For conciseness, they are not repeated herein.

Figure 8:
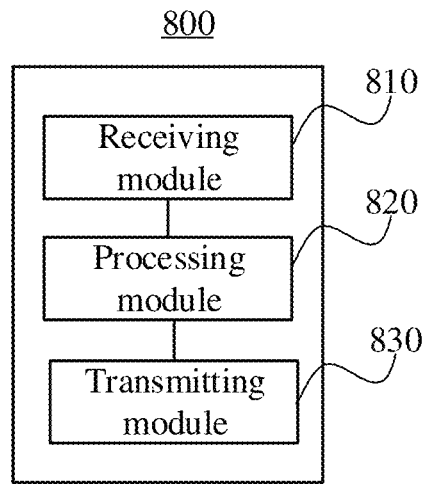
FIG. 8 is a schematic block diagram of a power conversion device disclosed in one embodiment of the present application.

FIG. 8 shows a schematic block diagram of a power conversion device 800 in one embodiment of the present application. As shown in FIG. 8, the power conversion device 800 includes a receiving module 810, a transmitting module 820 and a processing module 830.

In one embodiment of the present application, the receiving module 810 is configured to receive a first message transmitted by a battery management system of the power battery, wherein the first message indicates a charging readiness of the battery management system; the transmitting module 820 is used configured to forward the first message to the charging pile; and the processing module 830 is configured to perform a pre-charging, wherein the pre-charging includes charging a capacitor in the power conversion device.

Optionally, the receiving module 810 is further configured to receive a second message transmitted by the charging pile, wherein the second message indicates a charging readiness of the charging pile; and the transmitting module 820 is further configured to transmit an output suspending message to the charging pile under a condition that the pre-charging is not completed, wherein the output suspending message instructs the charging pile to suspend output of a charging power.

Optionally, the transmitting module 820 is further configured to transmit an output permitting message to the charging pile under a condition that the pre-charging is completed, wherein the output permitting message instructs the charging pile to output a charging power.

Optionally, the receiving module 810 is further configured to receive a second message transmitted by the charging pile, wherein the second message indicates a charging readiness of the charging pile; and the transmitting module 820 is further configured to transmit a charging demand message to the charging pile under a condition that the pre-charging is not completed, wherein the charging demand message carries a demand current value and the demand current value is a minimum value of a demand current.

Optionally, the transmitting module 820 is further configured to transmit a charging demand message to the charging pile under a condition that the pre-charging is completed, wherein the charging demand message carries a demand current value and the demand current value is an actual value of a present demand current.

Optionally, the processing module 830 is configured to perform the pre-charging when it is determined that the power conversion device is in a normal state.

Optionally, the processing module 830 is configured to detect a state of the power conversion device in a process of the pre-charging, and perform an abnormal processing under a condition that the state of the power conversion device is a pre-charging abnormal state.

Optionally, the processing module 830 is configured to end the pre-charging after it is determined that the pre-charging is completed.

In another embodiment of the present application, the receiving module 810 is configured to receive a first message transmitted by a battery management system of the power battery, wherein the first message indicates a charging readiness of the battery management system; the transmitting module 830 is configured to perform a pre-charging, wherein the pre-charging includes charging a capacitor in the power conversion device; and the transmitting module 820 is used configured to forward the first message to the charging pile after the pre-charging is completed.

Optionally, the receiving module 810 is further configured to receive a second message transmitted by the charging pile, wherein the second message indicates a charging readiness of the charging pile; and the transmitting module 820 is further used configured to forward the second message to the battery management system.

Optionally, the processing module 830 is configured to perform the pre-charging when it is determined that the power conversion device is in a normal state.

Optionally, the processing module 830 is configured to detect a state of the power conversion device in a process of the pre-charging, and perform an abnormal processing under a condition that the state of the power conversion device is a pre-charging abnormal state.

Optionally, the processing module 830 is configured to end the pre-charging after it is determined that the pre-charging is completed.

Figure 9:
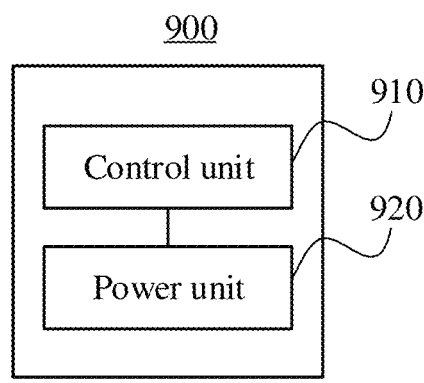
FIG. 9 is a schematic block diagram of a power conversion device disclosed in another embodiment of the present application.

FIG. 9 shows a schematic block diagram of a power conversion device 900 in another embodiment of the present application. As shown in FIG. 9, the power conversion device 900 includes a control unit 910 and a power unit 920.

The control unit 910 transmits a pre-charging instruction to the power unit 920 when the power unit 920 is in a normal state; and the power unit 920 is configured to start a pre-charging according to the pre-charging instruction, wherein the pre-charging includes charging a capacitor in the power unit 920.

Optionally, the control unit 910 is further configured to transmit an invalid pre-charging instruction to the power unit 920 before the pre-charging instruction is transmitted to the power unit 920; the power unit 920 is further configured to: in response to the invalid pre-charging instruction, transmit a first state message to the control unit 910, wherein the state of the power unit 920 is carried in the first state message; and the control unit 910 is further configured to determine the state of the power unit 920 according to the first state message.

Optionally, the power unit 920 is further configured to detect a state of the power unit 920 and transmitting a second state message to the control unit 910 after the pre-charging is started, wherein the state of the power unit 920 is carried in the second state message.

Optionally, the control unit 910 is further configured to perform an abnormal processing when the power unit 920 is in a pre-charging abnormal state.

Optionally, the power unit 920 is further configured to transmit a pre-charging completion message to the control unit 910 after the pre-charging is completed; and the control unit 910 is further configured to transmit a pre-charging end instruction to the power unit 920 according to the pre-charging completion message.

Optionally, the control unit 910 is further configured to receive a first message transmitted by a battery management system of the power battery before the pre-charging instruction is transmitted to the power unit 920, wherein the first message indicates a charging readiness of the battery management system.

Optionally, the control unit 910 is further used configured to forward the first message to the charging pile after completing the pre-charging; receiving a second message transmitted by the charging pile, wherein the second message indicates a charging readiness of the charging pile; and forwarding the second message to the battery management system.

Optionally, the control unit 910 is further used configured to forward the first message to the charging pile; receiving a second message transmitted by the charging pile, wherein the second message indicates a charging readiness of the charging pile; and transmitting an output suspending message to the charging pile under a condition that the pre-charging is not completed, wherein the output suspending message instructs the charging pile to suspend output of a charging power.

Optionally, the control unit 910 is further used configured to forward the first message to the charging pile; receiving a second message transmitted by the charging pile, wherein the second message indicates a charging readiness of the charging pile; and transmitting a charging demand message to the charging pile under a condition that the pre-charging is not completed, wherein the charging demand message carries a demand current value and the demand current value is a minimum value of a demand current.

Embodiments of the present application further provide a charging pile and a BMS, wherein the charging pile and the BMS are respectively configured to perform the corresponding operations in the method of above various embodiments in the present application. Specifically, the charging pile and the BMS can be respectively configured to perform modules of the corresponding operations in the method of above various embodiments in the present application.

Figure 10:
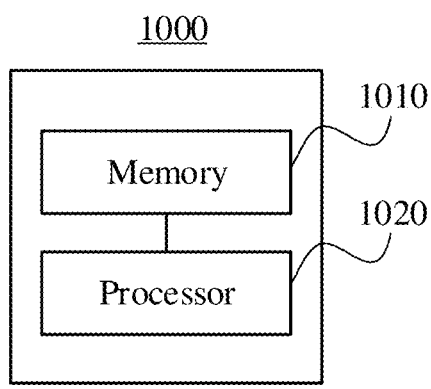
FIG. 10 is a schematic block diagram of a power conversion device disclosed in another embodiment of the present application.

FIG. 10 shows a schematic block diagram of a device 1000 in another embodiment of the present application. The device 1000 can be a power conversion device, a charging pile or a BMS. As shown in FIG. 10, the device 1000 includes a memory 1010 and a processor 1020, wherein the memory 1010 is configured to store an instruction and the processor 1020 is configured to read the instruction and perform the method in above various embodiments of the present application based on the instruction.

Embodiments of the present application further provide a readable storage medium for storing a computer program, the computer program being used for performing the method in the above various embodiments of the present application.

Although the present application has been described with reference to preferred embodiments, various improvements can be made thereto and equivalents can be used for replacement of members therein without departing from the scope of the present application. In particular, as long as a conflict does not exist, each technical feature mentioned in each embodiment can be combined in any manner. The present application is not restricted to particular embodiments disclosed herein, but to include all technical solutions falling in the scope of the claims.

What is claimed is:

1. A pre-charging method of a power conversion device, wherein the power conversion device is used for a power conversion between a charging apparatus and a power battery, and the method comprises:
   receiving, by the power conversion device, a first message transmitted by a battery management system of the power battery, wherein the first message indicates a charging readiness of the battery management system; and
   transmitting, by the power conversion device, the first message to the charging apparatus and performing a pre-charging, wherein the pre-charging comprises charging a capacitor in the power conversion device, and the power conversion device starts the pre-charging while forwarding the first message to the charging apparatus;
   receiving, by the power conversion device, a second message transmitted by the charging apparatus, wherein the second message indicates a charging readiness of the charging apparatus; and
   transmitting, by the power conversion device, a charging demand message to the charging apparatus under a condition that the pre-charging is not completed, wherein the charging demand message carries a demand current and value of the demand current is adjusted to a minimum value of the demand current to cause the charging apparatus to output a current according to the minimum value of the demand current when the pre-charging of the power conversion device is still not completed, and the minimum value of the demand current is greater than or equal to zero.

2. The method according to claim 1, wherein the method further comprises:
   transmitting, by the power conversion device, a charging demand message to the charging apparatus under a condition that the pre-charging is completed, wherein the charging demand message carries a demand current and value of the demand current value is adjusted to an actual value of the demand current to cause the charging apparatus to output a current according to the actual value of the demand current when the pre-charging of the power conversion device is completed.

3. The method according to claim 1, wherein performing the pre-charging by the power conversion device comprises:
   performing the pre-charging by the power conversion device when determining that the power conversion device is in a normal state.

4. The method according to claim 3, wherein the method further comprises:
   detecting a state of the power conversion device by the power conversion device when the power conversion device is in a process of the pre-charging, and performing an abnormal processing by the power conversion device under a condition that the state of the power conversion device is a pre-charging abnormal state.

5. The method according to claim 1, wherein transmitting a charging demand message to the charging apparatus by the power conversion device comprises:
   forwarding the second message to the battery management system by the power conversion device to cause the battery management system to send a charging demand message, wherein the charging demand message carries a demand current;
   receiving the charging demand message and adjusting value of the demand current in the charging demand message into the minimum value of the demand current by the power conversion device;
   transmitting the charging demand message to the charging apparatus by the power conversion device.

6. A power conversion device, wherein the power conversion device is used for a power conversion between a charging apparatus and a power battery, the power conversion device starts the pre-charging while forwarding the first message to the charging apparatus, and the power conversion device comprises:
   a receiver configured to receive a first message transmitted by a battery management system of the power battery, wherein the first message indicates a charging readiness of the battery management system;
   a transmitter configured to transmit the first message to the charging apparatus; and
   a processor configured to perform a pre-charging, wherein the pre-charging comprises charging a capacitor in the power conversion device;
   wherein the receiver is further configured to receive a second message transmitted by the charging apparatus, wherein the second message indicates a charging readiness of the charging apparatus; and
   the transmitter is further configured to transmit a charging demand message to the charging apparatus under a condition that the pre-charging is not completed, wherein the charging demand message carries a demand current and value of the demand current is adjusted to a minimum value of the a demand current to cause the charging apparatus to output a current according to the minimum value of the demand current when the pre-charging of the power conversion device is still not completed, and the minimum value of the demand current is greater than or equal to zero.

7. The power conversion device according to claim 6, wherein the transmitter is further configured to transmit a charging demand message to the charging apparatus under a condition that the pre-charging is completed, wherein the charging demand message carries a demand current and value of the demand current value is adjusted to an actual value of the demand current to cause the charging apparatus to output a current according to the actual value of the demand current when the pre-charging of the power conversion device is completed.

8. The power conversion device according to claim 6, wherein the processor is configured to perform the pre-charging when it is determined that the power conversion device is in a normal state.

9. The power conversion device according to claim 8, wherein the processor is configured to detect a state of the power conversion device in a process of the pre-charging, and perform an abnormal processing under a condition that the state of the power conversion device is a pre-charging abnormal state.

10. The power conversion device according to claim 6, wherein
the transmitter is further configured to forward the second message to the battery management system by the power conversion device to cause the battery management system to send a charging demand message, wherein the charging demand message carries a demand current;
the receiver is further configured to receive the charging demand message and processor is further configured to adjust value of the demand current in the charging demand message into the minimum value of the demand current by the power conversion device;
the transmitter is further configured to transmit the charging demand message to the charging apparatus by the power conversion device.

11. A non-transitory readable storage medium for storing a computer program for performing a pre-charging method of a power conversion device, wherein the power conversion device is used for a power conversion between a charging apparatus and a power battery, and the method comprises:
receiving, by the power conversion device, a first message transmitted by a battery management system of the power battery, wherein the first message indicates a charging readiness of the battery management system; and
transmitting, by the power conversion device, the first message to the charging apparatus and performing a pre-charging, wherein the pre-charging comprises charging a capacitor in the power conversion device, wherein the power conversion device starts the pre-charging while forwarding the first message to the charging apparatus;
receiving, by the power conversion device, a second message transmitted by the charging apparatus, wherein the second message indicates a charging readiness of the charging apparatus; and
transmitting, by the power conversion device, a charging demand message to the charging apparatus under a condition that the pre-charging is not completed, wherein the charging demand message carries a demand current and value of the demand current is adjusted to a minimum value of the demand current to cause the charging apparatus to output a current according to the minimum value of the demand current when the pre-charging of the power conversion device is still not completed, and the minimum value of the demand current is greater than or equal to zero.

12. The readable storage medium according to claim 11, wherein the method further comprises:
transmitting, by the power conversion device, a charging demand message to the charging apparatus under a condition that the pre-charging is completed, wherein the charging demand message carries a demand current and value of the demand current value is adjusted to an actual value of the demand current to cause the charging apparatus to output a current according to the actual value of the demand current when the pre-charging of the power conversion device is completed.

13. The readable storage medium according to claim 11, wherein the method further comprises:
detecting a state of the power conversion device by the power conversion device when the power conversion device is in a process of the pre-charging, and performing an abnormal processing by the power conversion device under a condition that the state of the power conversion device is a pre-charging abnormal state.

14. The non-transitory readable storage medium according to claim 11, wherein the method further comprises:
forwarding the second message to the battery management system by the power conversion device to cause the battery management system to send a charging demand message, wherein the charging demand message carries a demand current;
receiving the charging demand message and adjusting value of the demand current in the charging demand message into the minimum value of the demand current by the power conversion device;
transmitting the charging demand message to the charging apparatus by the power conversion device.

* * * * *